United States Patent [19]

Lange

[11] 4,445,078

[45] Apr. 24, 1984

[54] PROCESSOR MODULE FOR POWER FACTOR CONTROLLER

[75] Inventor: Philip E. Lange, Dayton, Ohio

[73] Assignee: Energy Vent, Inc., Dayton, Ohio

[21] Appl. No.: 525,422

[22] Filed: Aug. 23, 1983

Related U.S. Application Data

[63] Continuation of Ser. No. 243,495, Mar. 13, 1981, abandoned.

[51] Int. Cl.³ ............................................. H02P 5/40
[52] U.S. Cl. .................................. 318/729; 318/802; 318/805; 323/204; 363/74; 363/149
[58] Field of Search ............... 318/438, 729, 778, 779, 318/798–802, 805, 812; 363/49, 55, 56, 74, 149; 323/207, 201, 204, 238, 260

[56] References Cited

U.S. PATENT DOCUMENTS

| | | | |
|---|---|---|---|
| 4,052,648 | 10/1977 | Nola . | |
| 4,242,625 | 12/1980 | Hedges | 318/812 X |
| 4,249,120 | 2/1981 | Earle | 318/729 |
| 4,266,177 | 5/1981 | Nola | 318/801 |
| 4,333,046 | 6/1982 | Lee | 323/231 |

FOREIGN PATENT DOCUMENTS 1568507  5/1980  United Kingdom .

OTHER PUBLICATIONS

"Circuit Saves Power in AC Induction Motors"–F. J. Nola, *EDN*, 9/5/79, pp. 185–190.
"Tc Soft Start Control Manual", Reuland Electric Company, 8/77.

*Primary Examiner*—G. Z. Rubinson
*Assistant Examiner*—Richard M. Moose
*Attorney, Agent, or Firm*—H. Talman Dybvig

[57] ABSTRACT

A motor control circuit utilizes sample and hold circuitry whose operation is initiated by an analog switch to control the firing angle of silicon control rectifiers, thereby to minimize wasting of power supplied to the motor being controlled.

6 Claims, 31 Drawing Figures

FIG-9a  POSITIVE INPUT TO U1C

FIG-11a  POSITIVE INPUT TO U1APM

FIG-9b  NEGATIVE INPUT TO U1C

FIG-11b  OUTPUT FROM U1APM

FIG-9c  OUTPUT FROM U1C

PROCESSOR MODULE

PROCESSOR MODULE

PROCESSOR MODULE FOR POWER FACTOR CONTROLLER

This application is a continuation of U.S. Pat. Ser. No. 06,243,495 filed 3/13/81, now abandoned.

BRIEF SUMMARY OF THE INVENTION

In the present invention the voltage waveform of the electrical power delivered to a single phase of a motor control circuit is squared with hysteresis to provide a phase-shift of the waveform and such squared waveform applied to a ramp circuit that provides a positive voltage for one-half cycle and ramps from ground to a negative voltage for the next one-half cycle. At the same time the squared waveform is applied to a processor module which receives a signal produced by a current sensing device whose output is proportional to the current delivered by the mains to the motor in question. The processor module includes an analog switch device responsive to zero crossovers of the squared voltage waveform to operate sample and hold circuitry which holds an accumulated voltage representing the phase-shift imposed on the current waveform by operation of the motor, such accumulated voltage being compared with the ramp circuit for purposes of gating a control rectifier to initiate the delivery of power to the aforementioned single phase, such gating of power minimizing wastage of power in any half cycle during which the sample and hold circuitry was in its hold mode. The circuit arrangement allows the sample and hold circuitry to initiate power delivery to the phase being sampled at an optimum time during each half cycle of power delivery to the motor. For a 3 phase motor operation, sample and hold circuitry responsive only to a single phase is employed to support gating of all three motor current carrying phases.

DETAILED DESCRIPTION

Figure 1A:
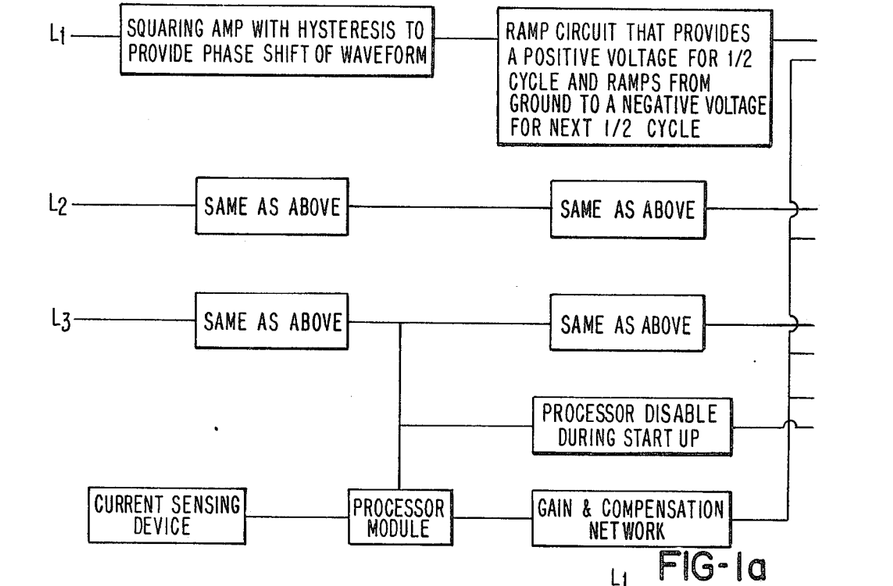
FIGS. 1a and 1b when the right end of FIG. 1a is joined to the left end of FIG. 1b comprise a schematic illustration of a motor control circuit embodying the present invention.
Figure 1B:
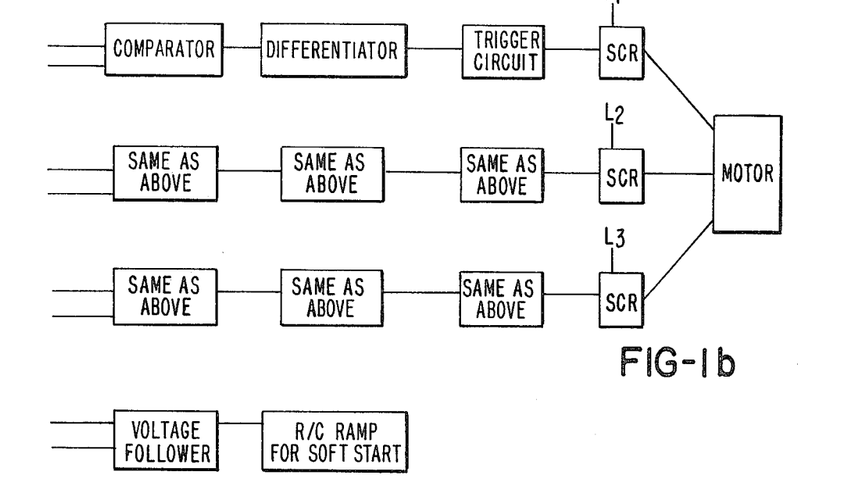

Referring to the drawings in greater detail, FIGS. 1a and 1b represent collectively a layout of power factor control circuitry connected with a Motor as shown in FIG. 1b. While the present invention may be applied to control circuitry for a single phase electric motor, as will be described, the drawings of the present application disclose utilization of the present invention in a 3 phase power factor controller.

In brief, the power factor controller layout appearing in FIGS. 1a and 1b is assembled in three sections, a first section connected to the first phase L1 of the power supply for the motor, the second section being connected to the second phase L2 of such power supply and the third section being connected to the third phase L3 of such power supply.

As appears in FIG. 1a, each of the power supply phases, L1, L2 and L3 is applied to a squaring amplifier with hysteresis to provide phase-shift. The resultant squared and phase-shifted waveform of one of the 3 phases, namely, the phase L3 in this case, is also applied to the processor module of the present invention. The processor module, as shown in FIG. 1a, also receives the output of a current sensing device, typically a transformer, which is responsive to the current passing in phase L3. Those skilled in the art will appreciate that the current sensing device could monitor any of the phases L1, L2 and L3. However, for purposes of a complete disclosure of the preferred embodiment of the present invention, the present drawings contemplate a current sensing device which is responsive to the current in the phase L3.

The squared and phase-shifted waveforms derived from the phases L1, L2 and L3 can be seen in FIG. 1a to have been applied to a ramp circuit that provides a positive voltage for one-half cycle and ramps from ground to a negative voltage for the next half cycle. It can also be seen in FIGS. 1a and 1b that the outputs of the three ramp circuits embodied in FIG. 1a are applied to comparators, each of which receives, for purposes of comparison, a signal derived from the processor module through a gain and compensation network. Thus there are 3 phases, each with an associated ramp circuit, inputting a signal to a comparator which compares the ramp signal with a signal derived from the processor module through a gain and compensation network, there being one comparator for each of the 3 phases.

To allow a start-up time for the motor to be regulated with the circuitry described in this application, FIG. 1a shows that the circuitry includes means for disabling operation of the processor module during a start-up period determined principally by an R/C ramp.

Assuming the processor disability period established with the aid of the R/C ramp has been exhausted, the processor module is enabled to respond to the squared waveform derived from phase L3 and the previously described comparator circuits, one for each phase, become effective. As will more fully appear, the outputs of the three comparator circuits associated with the 3 phases being delivered to the motor are differentiated and applied to trigger circuits for gating at properly timed intervals, the 3 phases of power being delivered to the motor.

Figures 2, 3A, 3B, 3C, 3D:
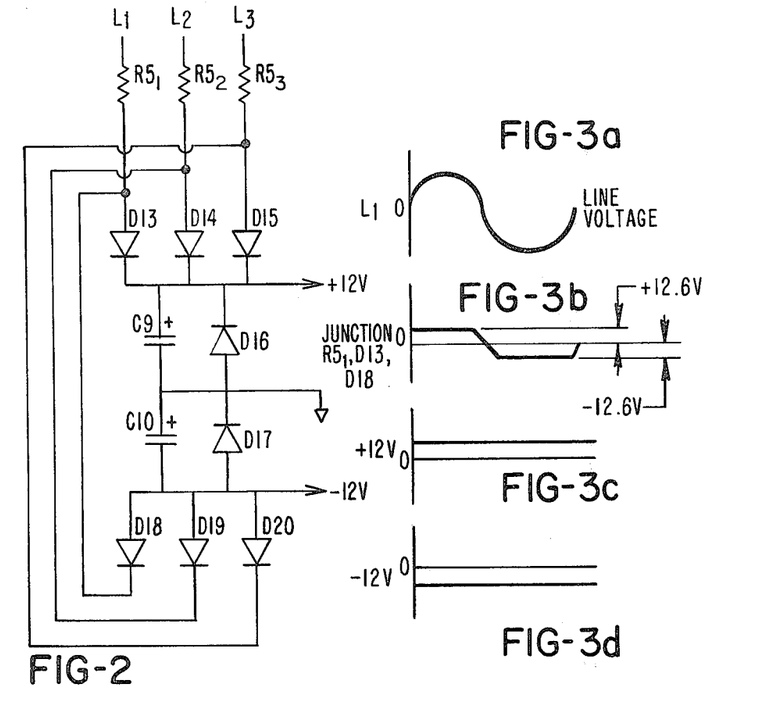
FIG. 2 is a schematic illustration of the power supply for the motor control circuit.
FIGS. 3a, 3b, 3c and 3d are illustrations of waveforms applicable to FIG. 2.

As illustrated in FIG. 2, the power supply is a simple 3 phase full wave bridge circuit made up of D13, 14, 15, 18, 19 and 20. C9 and C10 provide the necessary filtering. D16 and D17 are 12 zener diodes that regulate the power supply. $R5_1$, $R5_2$ and $R5_3$ limit the current capacity of the supply.

FIG. 2 may be considered as illustrating the components of a power supply circuit contained on a power supply board. It can be noted that the reference number R5 appears three times in FIG. 2, this redundancy in reference number application merely reflecting that the same resistance value is employed for accomplishing the same function in each of the 3 phases L1, L2 and L3. The R5 resistances appearing in FIG. 2 are identified with the respective phases in which they operate by the subscripts 1, 2 and 3 following the respective R5 reference identifications appearing in FIG. 2. Throughout the drawings the circuitry identified in the drawings is shown in connection with a source identification, examples being Control Board and Processor Module. A reference number applied to a component shown to be associated with the control board is unique to the control board. However, the same reference number identification may, on limited occasions, be used in connection with a different source identification. Thus each reference number is to be considered unique only when coupled to its source identification. For example, the reference number R3 located on a drawing identified as relating to the control board does not identify the same component as the reference number R3 located on a drawing identified as relating to the processor module. To avoid confusion, processor module parts are provided with reference designations which terminate with PM as a suffix.

FIG. 3a depicts the waveform for the line voltage applied to phase L1. FIG. 3b depicts the voltage power at the junction of the resistor R5, illustrated in FIG. 2, with the diodes D13 and D18 also illustrated in FIG. 2. Additionally FIGS. 3c and 3d include illustrations of the positive and negative 12 V signals derived from the circuitry illustrated in FIG. 2.

Figure 4:
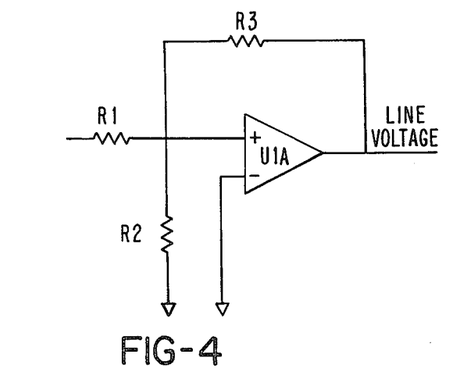
FIG. 4 is a schematic illustration of a squaring amplifier assembly employed in the present invention.

Referring to FIG. 4, the squaring amplifier for phase L1, described with reference to FIGS. 1a and 1b, is more particularly identified with the identification letters U1A in this FIG. 4. Similar squaring amplifier circuitry, not shown, is employed for phases L2 and L3. The squaring amplifier U1A senses the line voltage. R3 provides a small amount of feedback that causes a small phase-shift of U1A's output in relation to its input. This phase-shift will later be understood to hinder early SCR gating, near zero crossing, where SCR anode voltages or gate firing sources have not yet reached effective potentials.

Figure 5A:
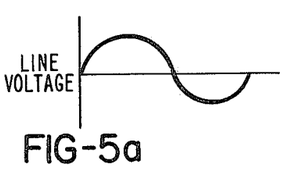
FIGS. 5a and 5b illustrate waveforms applicable to FIG. 4.
Figure 5B:
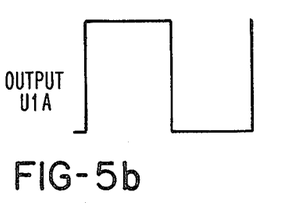

FIGS. 5a and 5b compare the phase-shifted line voltage with the squared output of squaring amplifier U1A.

Figure 6:
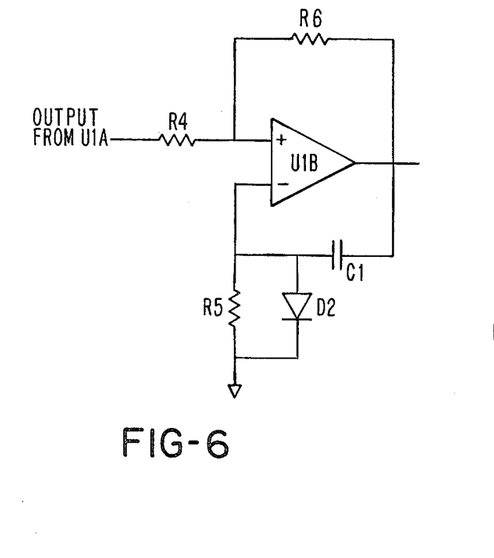
FIG. 6 is a schematic illustration of a ramping circuit employed in the present invention.

Referring to FIG. 6, when the output from U1A is +12 V, the output of U1B is +12 V. C1 is charged very quickly to +12 V through D2. When the output of U1A switches to −12 V, the output of U1B swings toward ground. The positive charge on C1 is quickly discharged to ground. As the output of U1B becomes negative, D2 is biased off and C1 is then charged to a negative voltage through R5. The output of U1B then ramps toward a negative voltage.

Figure 7A:
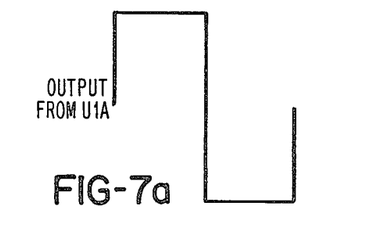
FIGS. 7a and 7b are illustrations of waveforms applicable to FIG. 6.
Figure 7B:
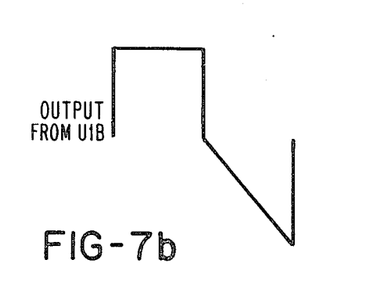

FIG. 7 shows the squared output from U1A in comparison to the output of U1B.

Figure 8:
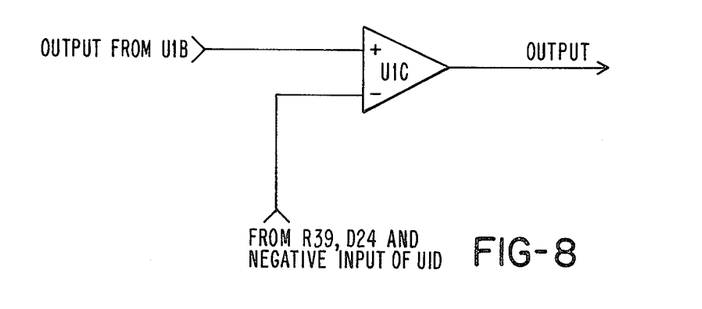
FIG. 8 is a schematic illustration of a comparator circuit employed in the present invention.

Referring to FIG. 8, U1C compares output of U1B with the negative input of U1C. The output U1C is high until the positive input is less than the negative input.

Figure 9A:
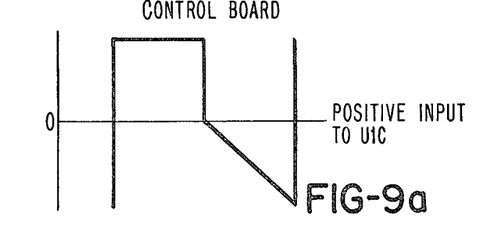
FIGS. 9a, 9b and 9c are illustrations of waveforms applicable to FIG. 8.
Figure 9B:
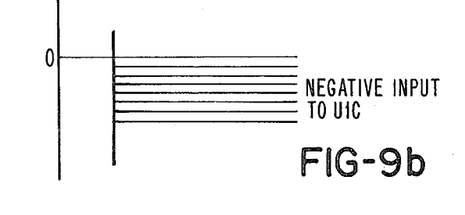
Figure 9C:
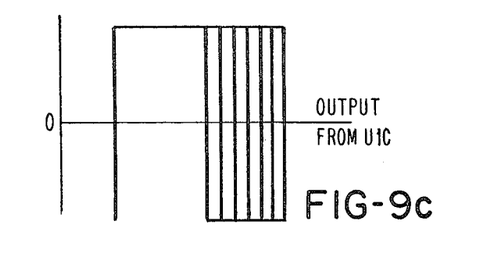

FIGS. 9a, 9b and 9c shows the waveforms for the positive input to U1C, the negative input to U1C and the output from U1C.

Figures 10, 12:
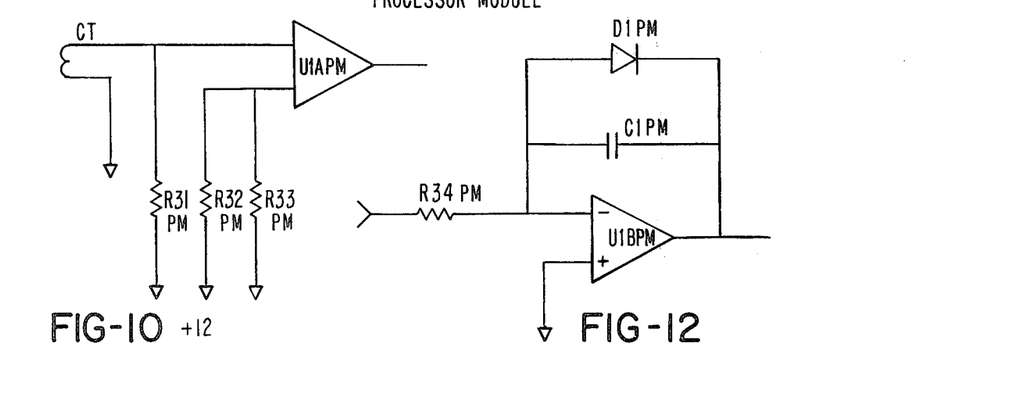
FIG. 10 is a schematic illustration of amplifier circuitry employed in the present invention.
FIG. 12 is a schematic illustration of integrator circuitry employed in the present invention.

Referring to FIG. 10, U1APM operates with open loop gain. The current waveform is entered into the positive input and a positive bias voltage is entered into the negative input. When the voltage from the current transformer is more positive than the bias voltage, the output swings high.

Figure 11A:
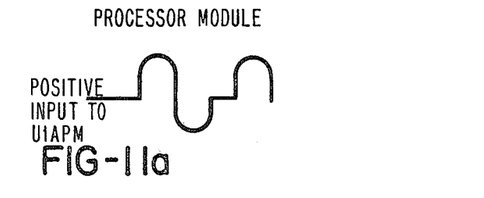
FIGS. 11a and 11b are illustrations of waveforms applicable to FIG. 10.
Figure 11B:
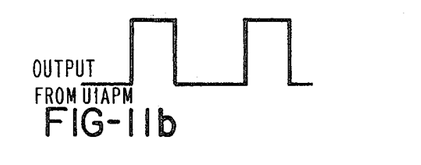

FIG. 11 illustrates the positive input to U1APM in relation to its output.

Referring to FIG. 12, U1BPM is an integrator with a diode connected across the integrating capacitor. The diode is used to prevent the output of U1BPM from going below ground, necessary only for protection of U2PM.

Figure 13A:
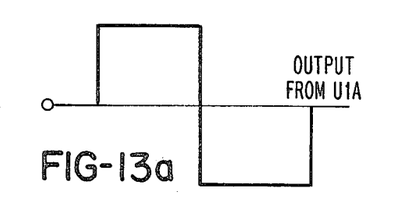
FIGS. 13a and 13b are illustrations of waveforms applicable to FIG. 12.
Figure 13B:
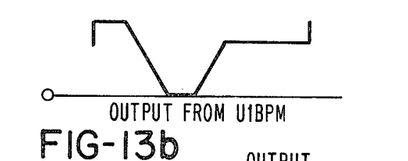

FIGS. 13a and 13b illustrate the output from U1A (Control Board) in comparison to the output from U1B (Processor Module).

Figure 14:
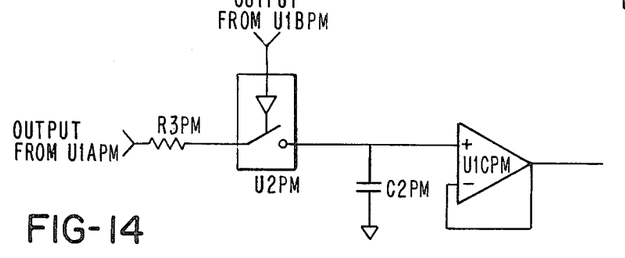
FIG. 14 is a schematic illustration of analog switch circuitry employed in the present invention.

Referring to FIG. 14, U2PM is an analog switch. When its gate is at ground the switch is closed, when its gate is positive the switch is open. When the output of U1BPM nears ground, U2PM and the trailing edge information from the output of U1APM sampled and stored in C2PM. When the output from U1BPM rises, the switch is opened and the sample is held in C2PM until the output from U1BPM ramps down again. U1CPM operates as a voltage follower with high input impedance, the output of U1CPM is the same as the voltage stored on C2PM (R3PM, U2PM, C2PM and U1CPM are all part of a sample and hold circuit).

Figure 15A:
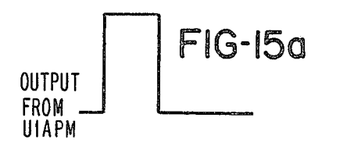
FIGS. 15a and 15b are illustrations of waveforms applicable to FIG. 14.
Figure 15B:
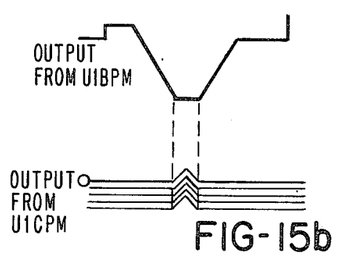

FIG. 15 illustrates the output from U1APM in relation to the output from U1BPM and the output from U1CPM.

Figure 16:
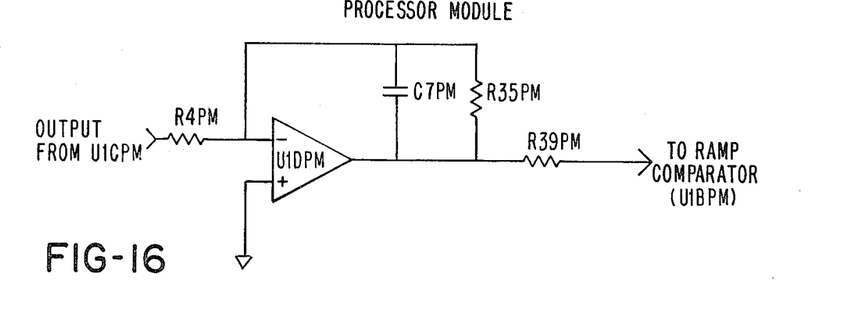
FIG. 16 is a schematic illustration of filter circuitry employed in the present invention.

Referring to FIG. 16, U1DPM acts as a low pass filter. This circuit has a 6 dB per octave roll off after a closed loop 3 dB point defined by the corner frequency, the corner frequency is $fc = \frac{1}{2}\pi R35C7$. Gain below corner frequency is defined by the ratio of R35PM to R4PM. The circuit may be considered as an AC integrator at frequencies well above the corner frequency. However, the time domain response is that of a single RC rather than an integrator $\frac{1}{2}\pi R4C7$. This filter is the lag network for the entire control system used to compensate for the inertia of the motor and its load.

Figure 17:
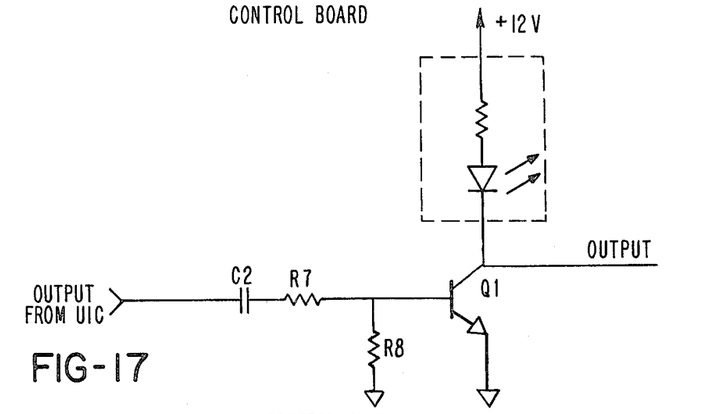
FIG. 17 is a schematic illustration of L.E.D. sinking circuitry employed in the present invention.

Referring to FIG. 17, C2 and R7 differentiate the output of U1C. The pulse of the trailing edge is used to turn on Q1 only for the duration of the pulse. Q1 is used to sink the current of an L.E.D. located inside an optically coupled triac, which ultimately gates the SCRs.

Figure 18:
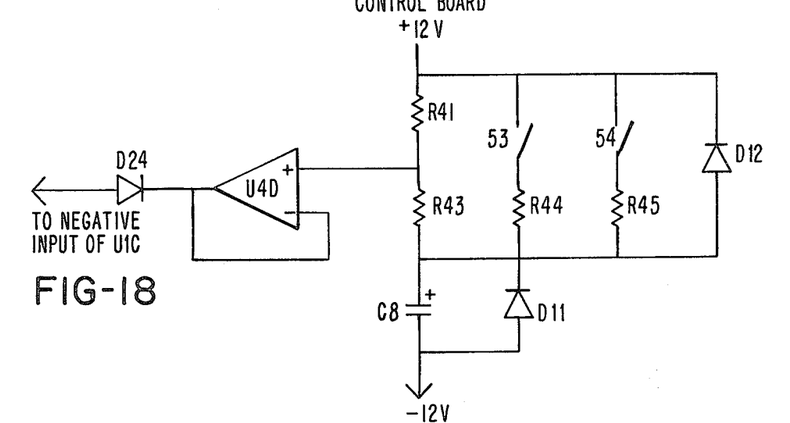
FIG. 18 is a schematic illustration of an operational amplifier employed in the present invention and functioning as a soft start.

Referring to FIG. 18, U4D operates as a voltage follower in this soft start circuit. D24 prevents the negative input of U1C from becoming positive when the output of U4D becomes positive. The positive terminal of C8 is at −12V at power up. R41 and R43 forms a voltage divider circuit that determines the maximum negative voltage applied to the positive input of U4D. C8 then charges through R41 and R43. As C8 charges, the voltage between R41 and R43 rises as does the output from U4D, which, when applied to the ramp comparators and hence SCR gate circuits, allows applied motor voltage to rise at the same rate to normal line voltage. R44 and/or R45 may be switched in to change the charge time of C8 without affecting the maximum negative voltage on the positive input of U4D. D12 and D11 discharge C8 when the power is shut off.

Figure 19:
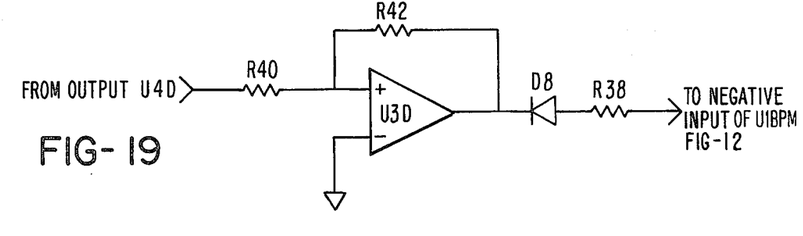
FIG. 19 is a schematic illustration of a zero crossover detection circuit employed in the present invention.

Referring to FIG. 19, U3D is a zero crossover detector used to disable the processor module during the soft start period. When the output of U4D is negative, the output of U3D is low and the negative input of U1BPM of the processor module is held low. As the output of U4D crosses ground, the output of U3D switches positive and D8 blocks the voltage from reaching the negative input of U1BPM of the processor module.

The layout of FIGS. 1a and 1b comprises three sections, each producing a waveform modulated by one of the 3 phases of a 3 phase motor. The foregoing discussion of the Figures included in this application has been confined to a detailed description of one of the three sections described with reference to FIGS. 1a and 1b, the other two sections of such Figures being of the same general construction. The current sensing device shown in block diagram in FIG. 1a includes transformer coil CT illustrated in FIG. 10. FIG. 1a shows the processor module along with the current sensing device to be modulated by the phase winding L3 indicated in FIG. 1a. Those skilled in the art will appreciate that the processor module, as well as the processor disable circuitry indicated in FIG. 1a might have been associated with any one of the 3 phase windings in the case of the 3 phase motor. In the case of a 1 phase motor, of course, the processor module, disable circuitry and current sensing device would be connected to the single phase in the manner shown in FIG. 1a have been connected to the L3 phase winding.

It will be noted that an output signal from the processor module through the gain and compensation network is applied to a comparator included in each of the three sections laid out in FIGS. 1a and 1b. It will be noted, however, that the sample and hold circuitry illustrated in FIG. 14 samples only 1 phase in the case of a 3 phase motor, once during each cycle of operation. The signal held by the sample and hold circuit is a voltage signal which is compared to the ramp signal generated in each of the phases identified in FIGS. 1a and 1b as L1, L2 and L3. The output from the comparator is a square wave which has a modulated pulse width. The square wave is then differentiated and the negative differentiated signal is then used to trigger each SCR or electronic switch. The circuit functions to control the firing point of the SCR. This control of the SCR firing point minimizes the delivery of power to the motor being controlled as a result of the voltage stored in the sample and hold capacitor C2PM. For example, if the voltage going into the comparator circuit is near ground potential, it intercepts a ramp signal near ground potential and the SCR is turned on as soon as a voltage is present at the SCR. If the voltage compared to the ramp waveform is negative and intersects the middle of the ramp, the signal going to the SCR would then be delayed 90° so the voltage to the motor would be shut off for a 90° portion of the voltage cycle. In this fashion the circuitry delivers to the motor only that power required to complete each cycle of motor operation against whatever load the motor is encountering.

Figure 20:
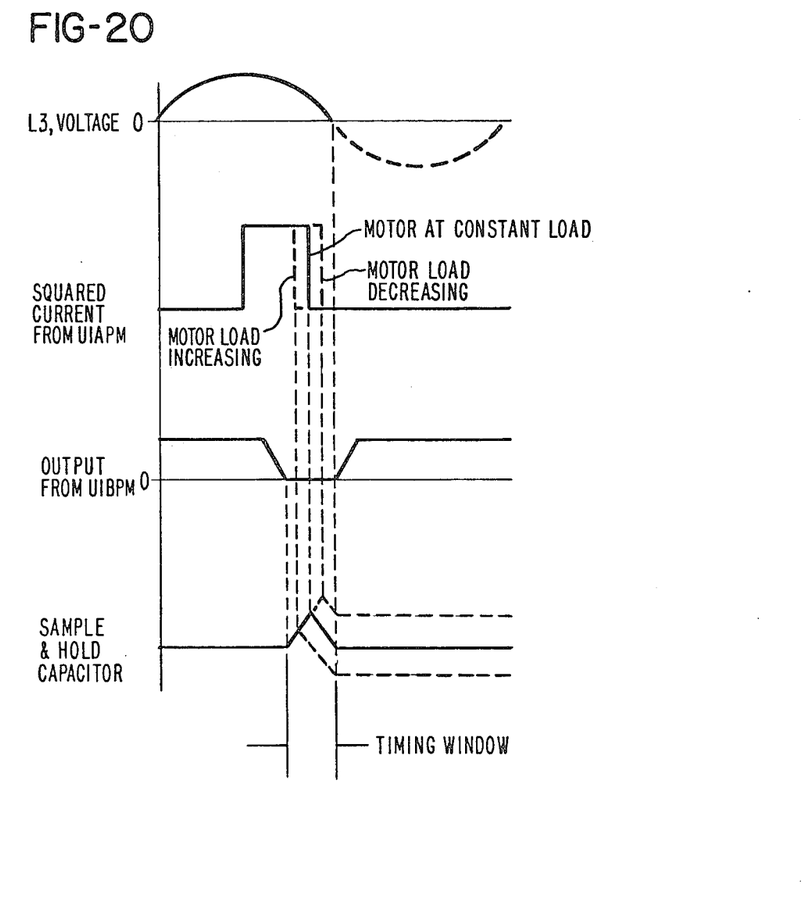
FIG. 20 is a schematic illustration of the dynamics of the sample and hold circuit.

The dynamics of the sample and hold circuit are best illustrated by first looking at the system at a constant load see FIG. 20. When the system is at a constant load, the trailing edge of the current waveform falls in the center of the timing window. That being the case, the sample and hold capacitor C2PM starts to charge as soon as the timing window opens. It charges until it reaches the trailing edge of the current waveform, then starts to discharge until the end of the timing window. At that point the voltage across C2PM is held. Under constant load conditions, the charge time and the discharge time of C2PM are equal to one another, and the voltage held across C1 equals the previous voltage held across C2PM before the timing window opens.

When the load on the motor decreases, the trailing edge of the current waveform is delayed. As a result of the delay, C2PM charges for a longer period of time and discharges for a shorter period of time. Therefore, the voltage held across C2PM will be greater than the voltage previously held across C2PM.

This increase in voltage on C2PM after going through U1DPM will result in a more negative voltage being applied to the negative input of U1C on the control board. This voltage being more negative causes the SCRs to trigger at a later firing angle, thereby reducing the current to the motor. By reducing the current to the motor, the trailing edge of the current waveform is advanced until the charge and discharge time of C2PM is equal. One skilled in the art will be able to recognize that the converse conditions are true when the load on the motor increases.

Although the preferred embodiment of this invention has been described, it will be understood that various changes may be made within the scope of the appended claim.

Having thus described my invention, I claim:

1. In a motor control circuit for an electric motor connected to a source of voltage, means for producing a first waveform signal representative of the voltage, means for producing a second waveform signal representative of the motor current, sample and hold means responsive to said first and second waveform signals for producing a voltage signal proportional to the phase difference between said first and second waveform signals and for holding said voltage signal, said sample and hold means including an analog switch having a gate portion and a switch portion, said sample and hold means further including capacitance means connected to said switch portion for responding to the voltage of, and thus sampling, said second waveform signal only when said switch portion is conductive, means for applying said first waveform signal to said gate portion, means for applying said second waveform signal to said switch portion, differentiating means for periodically ramping said first waveform signal to ground, said switch portion comprising means becoming conductive only when said first waveform signal has been ramped to ground, and means responsive to the voltage held by said capacitance for controlling the firing of a solid state switch in circuit with said source.

2. The motor control circuit of claim 1 wherein said motor is a multi-phase motor and said means for producing a second waveform signal includes current sensing means for sensing the current delivered to one phase of said motor.

3. The motor control circuit of claim 1 including means for disabling said sample and hold means for a motor start-up period.

4. The motor control circuit of claim 1 wherein the means for producing the first waveform signal includes a ramp generator that generates a waveform that is at the most positive voltage for half of the cycle and for the next half of the cycle ramps from ground to a negative voltage.

5. The motor control circuit of claim 1 wherein said first means includes squaring amplifier means for providing a phase-shift in said first waveform signal.

6. The motor control circuit of claim 1 wherein said source of voltage is a three phase voltage source, said means for producing a second waveform signal including a current transformer responsive to only one of said three phases.

* * * * *

UNITED STATES PATENT AND TRADEMARK OFFICE
CERTIFICATE OF CORRECTION

PATENT NO. : 4,445,078
DATED : April 24, 1984
INVENTOR(S) : Philip E. Lange

It is certified that error appears in the above-identified patent and that said Letters Patent are hereby corrected as shown below:

Column 4, line 35, insert ---closes--- after "U2PM".

Column 4, line 50, insert ---this--- after "below".

Column 5, line 39, insert ---to--- after "1a".

Column 6, line 15, change "C1" to ---C2PM---.

Signed and Sealed this

Twenty-seventh Day of November 1984

[SEAL]

Attest:

GERALD J. MOSSINGHOFF

Attesting Officer    Commissioner of Patents and Trademarks